Oct. 12, 1965     A. H. ROBSON     3,211,075
DIFFERENTIAL PRESSURE CONTROL OF CONTIGUOUS SPACES
Filed Aug. 31, 1962
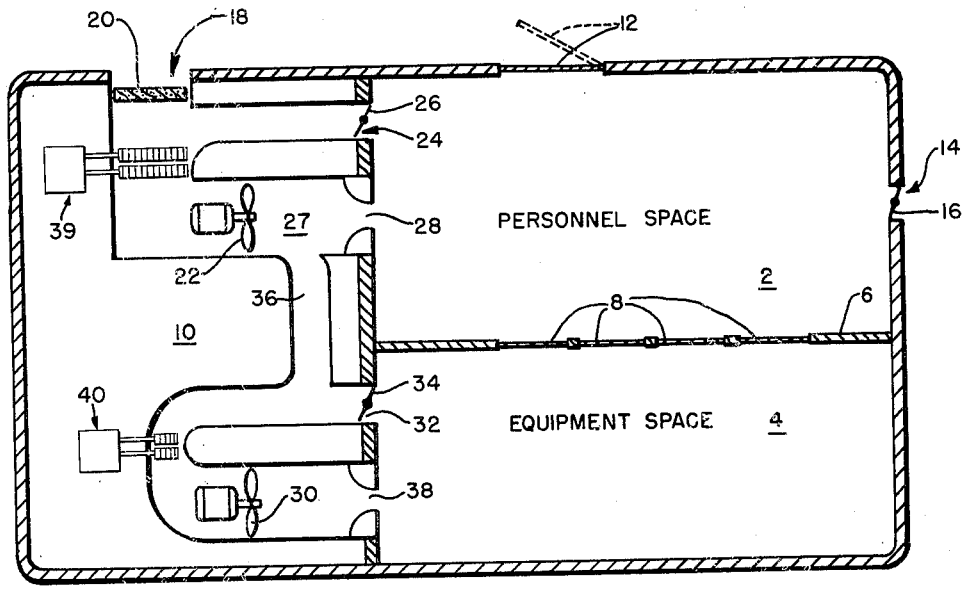
FIG. 1
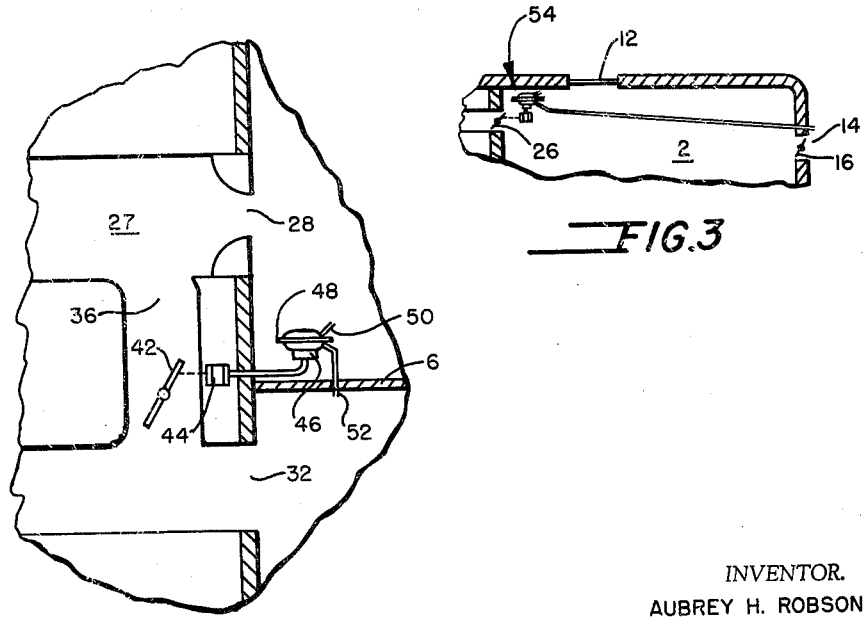
FIG. 2
FIG. 3
INVENTOR.
AUBREY H. ROBSON
BY Edward C. Arenz
ATTORNEY

United States Patent Office 3,211,075
Patented Oct. 12, 1965

3,211,075
DIFFERENTIAL PRESSURE CONTROL OF CONTIGUOUS SPACES
Aubrey H. Robson, Rock Island, Ill., assignor to American Air Filter Company, Inc., Jefferson, Ky., a corporation of Delaware
Filed Aug. 31, 1962, Ser. No. 220,788
8 Claims. (Cl. 98—1.5)

This invention relates to an air conditioning and circulating arrangement for contiguous spaces which are to be maintained with a substantially constant air pressure differential therebetween.

The invention finds one application in vans or trailers in which one compartment holds electronic equipment, an adjoining compartment serves to accommodate personnel and a small third compartment lodges air conditioning equipment. The wall separating the equipment and personnel compartments serves as the access panel for an assortment of pull-out drawers or "black boxes," in military terminology, containing unitized electronic equipment. The electronic equipment must be artificially cooled when in use and the air serving such a purpose is generally thoroughly filtered. To preserve such clean air conditions it is desirable to sustain the electronic compartment at a slightly higher pressure than the personnel compartment to prevent infiltration of contaminated air. Since the personnel from time to time enter and leave the personnel space, the pressure in the personnel space will undergo abrupt changes at such times as the door to outside is opened. The arrangement according to the invention compensates for such changes in pressure in the personnel space by correspondingly effecting a compensating change in pressure in the equipment space. Also, changes in pressure in the personnel space will occur with variations in wind velocities against walls containing openings, and the effect of such is compensated for in one aspect of the invention. While the invention may be used in other applications, it will be described primarily in connection with the foregoing environment.

In accordance with the invention, a recirculating air system including separate blower means in each system is provided for each of the spaces. An interconnecting duct places the pressure side of the personnel space blower means in communication with the suction side of the equipment space blower means. The interconnecting duct may be provided with damper means operative in response to a selected change in the difference in pressure between the two spaces to vary the flow conditions in the duct or, alternatively, the damper means may be omitted if return air dampers for each of the spaces are provided.

The invention will be described in connection with several embodiments incorporating the principles of the invention by way of example and illustrated in the accompanying drawing wherein:

FIGURE 1 is a somewhat diagrammatic view, in the nature of a horizontal section, of an arrangement according to the invention;

FIGURE 2 is a fragmentary view of a part of the FIGURE 1 arrangement, but illustrating an alternative system incorporating the principles of the invention; and FIGURE 3 is another fragmentary view of a part of the FIGURE 1 arrangement, illustrating a refinement of the invention.

Referring to the drawing, FIGURE 1 diagrammatically represents a van which includes: a personnel space 2; an electronic equipment space 4 separated from the personnel space by a wall 6 having a plurality of hatches 8 to give access to the equipment units from the personnel space, some leakage of air from one space to another normally taking place through the wall hatch opening; and an air conditioning equipment section generally designated 10. The personnel space is provided with a door to the outside 12, and exhaust air opening 14 containing a damper 16.

To provide conditioned air to the personnel and equipment spaces, separate air systems are provided. The air system for the personnel space includes an outside air inlet 18 which is provided with a suitable air filter 20 and with a louver and/or operable dampers (neither of which are shown), and blower means 22 having its suction side connected to both the outside air inlet 18 and the return air opening 24 to the personnel space. The opening 24 has a return air damper 26 provided therein to control the degree of pressurization desired in the personnel space. The blower means 22 delivers air into the plenum 27 which is in communication with the personnel space through supply air opening 28.

The air system for the equipment space is similar to the personnel space system except that it does not have the suction side in communication with an outside air source but does have its suction side communicating with the pressure side of the personnel space air system. The equipment space blower means 30 has its suction side in communication with the return air opening 32 of the equipment space, this opening containing a damper 34, and also has its suction side in communication with the interconnecting duct 36 which leads to delivery plenum 27 of the personnel space system. The pressure side of the blower means 30 terminates in a supply air opening 38 for the equipment space 4. The air systems for the two spaces contain air heating and cooling equipment 39 and 40 as diagrammatically shown in the drawing. It will be understood that the blower means 22 and 30 for the respective spaces are sized in accordance with the air flow rate requirement for conditioning purposes and the resistance of the systems including the air cooling and heating apparatus employed therewithin.

The operation of the air systems will now be described with the personnel space system being considered first. The return air damper 26 and the exhaust damper 16 are adjusted to restrict the flow of air therethrough in accordance with a positive pressure value it is desired to obtain in the personnel space. With the suction side of blower means 22 in communication with outdoor air through the opening 18, the quantity of air admitted to the personnel space system will equal the leakage to outside through door 12 and exhaust opening 14 under normal operating conditions. When the door 12 is opened, the pressurized condition in the personnel space is substantially lost by the escape of air through the opened door, and since air within the personnel space 2 can pass more readily to outside through door 12 than through the resistance imposed by damper 26, the quantity of air entering outside air inlet 18 increases by the amount lost through the door opening. When the door 12 again closes, the pressurized condition of the personnel space is subsequently again attained, and the quantity of air admitted through opening 18 decreases to a value which just makes up for the leakage losses from the personnel space.

The equipment space air system may be considered as being superimposed upon the personnel space air system since the suction side is in communication with the pressure side of the personnel space system. The intent, of course, is to provide a pressure in the equipment space in excess of the pressure in the personnel space so the leakage of air, to the extent that it takes place, is from the equipment space to the personnel space.

The return air damper 34 provides means to produce whatever degree of pressurization is desired in the equipment space 4. By placing the air systems in communication through duct 36, it is assured that normally the pressure in the air system serving the equipment space will be of higher value than that in the personnel space 2, regardless of the comparative resistances produced by dampers 26 and 34. The air pressure generated in plenum 27 will equal the velocity pressure producing air flow through opening 28 plus the flow resistance of any diffusing grille disposed in opening 28, plus whatever above-ambient pressure is being maintained in personnel space 2. These pressure values will ordinarily be in the range of .2 to .4 inch of water column (W.C.), for the velocity pressure and outlet grille portion plus an additional .38 to .7 inch W.C. for pressurization. The pressure produced for velocity generation and overcoming outlet grille resistance in plenum 27 is the measure of pressure differential which communicating duct 36 sustains in the air system serving the electronic compartment. The additional pressure produced to pressurize space 2 becomes the background or common basic pressure for both systems and only becomes a factor in controlling differential pressure when space 2 pressure is lost by opening door 12. Thus under stable operating conditions, the only flow through interconnecting duct 36 will be the equivalent of the slight leakage between the spaces 2 and 4.

Now, when door 12 to the personnel space is opened, therewill be an abrupt drop in the pressure in the personnel space to atmospheric pressure and an equivalent drop in pressure in the plenum 27 on the pressure side of the blower means 22 of the personnel space air system. With this drop in the pressure in the plenum 27, and with the pressure on the suction side of the equipment space system being of a somewhat higher value momentarily, there will be either a reduction in air flow through duct 36, or a flow reversal, i.e., from the equipment space air system through the interconnecting duct 36 to the personnel space system. There will also be a momentarily increased flow of air from the equipment space through the return air opening 32 resulting from the reduction in pressure in the return duct to fan 30, so that the equipment space pressure will also drop to lower value but will continue to exceed the personnel space pressure by an amount again equal to the pressure developed by the blower means 30 in the plenum 27. When the door 12 is again closed, the original stable operating conditions will again be attained. This arrangement prevents generation of execessive pressure differentials across the dividing partition 6 when door 12 is opened.

In FIGURE 2 an arrangement is shown having an automatically controlled damper 42 provided in the interconnecting duct 36. The damper 42 is controlled by a pressure differential sensing controller including a reversible motor 44 which drives the damper and is in turn controlled by switch means 46. The switch means is associated with a static pressure responsive diaphragm 48 which is displaced one way or another way in response to the change in differential static pressures in the two spaces as sensed by the sensing elements 50 and 52 which are responsive to the pressures in the personnel space and equipment space, respectively, and which are connected to impose these pressures on the respectively opposite sides of the diaphram. Preferably, the pressure differential sensing controller arrangement is of the general type disclosed in my U.S. Patent 3,005,887 so that there may be slight changes in differential pressure without actuating the damper motor. It will be appreciated that when the automatic damper 42 is employed, there is no need for an adjustable return air damper 34 in the equipment space return air opening 32. In the automatically controlled damper system, the damper will operate toward a closed position in response to a differential pressure in excess of the desired differential, and toward an open position in response to a sensed differential pressure below the desired differential.

While heretofore no consideration has been given to the effect of wind pressures against walls containing openings, these may be significant in the operation of the system. The amount of positive pressure preferably maintained in personnel space 2 is that required to offset whatever wind velocity pressures are anticipated to be encountered as reacting against exhaust air flow through exhaust opening 14. Thus, if maximum velocities equivalent to a 60 m.p.h. gale at standard conditions of temperature and barometer are anticipated, a wind velocity pressure of 1.74 inches W.C. must be combated, demanding an internal pressure in excess of this in personnel space 2 if the wind pressure is directed against the wall containing exhaust opening it is desired to exhaust air from space 2 for ventilation reasons and to prevent infiltration through opening 14.

If, on the other hand, the wind pressure is perpendicular to the wall containing the door 12 and air inlet 18, the wind velocity pressure will tend to increase the internal pressure within the space 2 by an equivalent amount, thereby possibly producing an excessive rate of vented air through opening 14. The dampers 26 and 16 may be used in a manner which permits an adjustment of internal pressures and vent rates to compensate for such extreme externally imposed wind pressures.

If it is desired to sustain a preselected pressure in space 2 automatically, damper 26 (FIGURE 3) can be linked to a reversible damper motor similarly to the arrangement shown in FIGURE 2, with the pressure differential sensing control (generally designated 54 as a whole in FIGURE 3) in this case being responsive to the difference in pressure between personnel space 2 and the outside velocity pressure against the outside wall adjacent exhaust opening 14. Then the control device is adjusted to sustain the preferred normal pressure differential sufficient to produce a desired exhaust flow rate through exhaust opening 14, regardless of changes in back pressure against exhaust opening 14 produced by wind conditions, as follows. With door 12 closed, damper 16 wide open, no wind pressures impinging, and damper 26 disconnected from controller 54, damper 26 is gradually closed manually until the flow rate out of opening 14 equals the maximum required. With the dampers so disposed, controller 54 will assume maximum closing demand position if the internal pressure in personnel space 2 is below the differential pressure setting selected. If, however the controller does not so react, a slightly higher setting should be selected until the controller reaction to demanding greater pressure does appear. Thereafter, damper 26 is gradually closed, manually, until the controller just responds by moving away from the closing demand end position. When the damper motor reaches mid position, it is de-energized and damper 26 is secured (at its aforementioned position) to the linkage connecting it to the controller. This manipulation achieves the requisite linked relationship between damper 26 and controller.

The controller may then be re-energized and the controller will position damper 26 until the selected differential pressure is produced in personnel space 2. Thereupon hand damper 16 is re-adjusted until the preferred nominal exhaust flow rate is obtained. During this manipulation the controller will reposition damper 26 to sustain the selected differential pressure. Thereafter, if wind pressure builds up against exhaust opening 14, the controller will close damper 26 until the pressure within personnel space 2 exceeds wind pressure against the wall having opening 14 by the setting of the controller, and will do so up to the maximum pressurizing capabilities of fan 22.

If wind pressure impresses against the wall in which outside air opening 18 is disposed, probably simultaneously producing a slight negative pressure immediately adjacent opening 14, the controller will open damper 26, whereupon the pressure differential effect would be reduced by an amount equal to that previously produced by damper 26 plus the pressure drop across filter 20. Should this not be enough to compensate for the wind pressure against filter 20, an excessive exhaust flow rate would occur through opening 14. In such a condition relief can be gained, manually, by further restricting opening 14 with damper 16 until the controller is noted to be starting to close damper 26 again, evidencing restoral of the differential pressure across opening 14 that will produce the preferred exhaust flow rate. Under such an adjustment it also follows that a positive pressure will be produced against the inside of door 12 in excess of wind pressure against its outside surface, by the amount of the setting in the controller so that the door can be opened without creating a sudden in-rush of air. During all these conditions the interconnecting duct 36 produces means for sustaining a still higher pressure in equipment space 4 than in personnel space 2 for reasons hereinbefore outlined.

The invention claimed is:

1. In combination an arrangement for maintaining a substantially constant air pressure differential between means forming a personnel space subject to being placed in communication with the outdoors from time-to-time, and means forming a contiguous equipment space separated from the personnel space by a wall through which air may exfiltrate from one of said spaces to the other:
    (a) means forming an air recirculating and conditioning system including a pressure side and having both a recirculation air inlet and a conditioned air outlet in communication with said personnel space, and blower means therebetween;
    (b) means forming a separate air recirculating and conditioning system including a suction side and having both a recirculation air inlet and a conditioned air outlet in communication with said equipment space, and second blower means therebetween;
    (c) means for admitting outdoor air to the suction side of said personnel space system;
    (d) air passage means connecting said pressure side of said personnel space system with said suction side of said equipment space system;
    (e) and means for changing the air flow resistance of at least one of said systems to vary the air flow exchange through said air passage means.

2. The system of claim 1 including:
    (a) means for varying the open area of said connecting passage means in accordance with variations from a selected value in the differential pressure between said compartments.

3. The system of claim 1 wherein:
    (a) said personnel compartment includes a dampered exhaust opening to outdoors; and
    (b) dampers are provided for the recirculation air inlets of each of said systems.

4. The system of claim 3 including:
    (a) means controlling the recirculation air inlet damper for said personnel space in response to departures from a selected differential pressure range between said personnel space and the outdoor velocity pressure adjacent said exhaust opening.

5. In an air circulating and conditioning arrangement maintaining a substantially constant air pressure differential between adjacent compartments on opposite sides of a wall through which air leakage occurs, one of said compartments being subject to being placed in open communication with the outdoors from time-to-time:
    (a) means forming a first air recirculating and conditioning system including a pressure side for the compartment to be maintained at the lower pressure, including an outdoor exhaust opening in said compartment having an adjustable damper therein, a return air inlet having a damper therein for the return of air from said compartment to the suction side of said system, and means to admit outdoor air to the suction side of said system;
    (b) means forming a second air recirculating conditioning system including a suction side for the other of said compartments;
    (c) air passage means connecting said pressure side of said first system to said suction side of said second system; and
    (d) means controlling said return air inlet damper of said first system in response to departures from a selected differential pressure range between the lower pressure compartment and the outdoor velocity pressure adjacent said outdoor exhaust opening to maintain an internal pressure in said lower pressure compartment in a predetermined range in excess of said outdoor velocity pressure adjacent said outdoor exhaust opening.

6. In an air circulating and conditioning arrangement for adjacent enclosures enclosing spaces separated by a wall through which air leakage occurs:
    (a) a first of said enclosures having a door to outside and an exhaust air opening containing an adjustable damper;
    (b) means forming a first air recirculating and conditioning system including a pressure side for said first space including an air outlet and a return air inlet in communication with said first space, and an adjustable damper in said return air inlet;
    (c) means for admitting outside air to the suction side of said first system;
    (d) a second of said enclosed spaces;
    (e) means forming a second air recirculating and conditioning system including a suction side for said second space including an air outlet and a return air inlet in communication with said second space; and
    (f) air passage means connecting said pressure side of said first system to said suction side of said second system to raise the level of pressure for said second system operation to a value above the level of pressure of said first system operation.

7. The arrangement of claim 6 including:
    (a) damper means in said air passage means; and
    (b) means responsive to departures from a selected difference in pressure between said first and said second spaces to vary the position of said air passage damper means for maintaining said selected difference in pressure.

8. In combination with adjacent compartments, an air circulating and conditioning arrangement for maintaining a substatnially constant air pressure differential between such adjacent compartments on opposite sides of a wall through which air leakage occurs, one of said compartments being subject to being placed in open communication with the outdoors from time to time:
    means forming a separate air recirculating and conditioning system for each compartment, each system including blower means having a pressure side and a suction side in a passage having both an air inlet and an air outlet communicating with its respective compartment;

means for admitting outdoor air to said suction side of said blower means in said passage of said system associated with the compartment to be maintained at the lower pressure; and air passage means connecting said pressure side of said passage of said lower pressure compartment system with said suction side of said passage of said higher pressure compartment system.

References Cited by the Examiner

UNITED STATES PATENTS

| | | | |
|---|---|---|---|
| 1,947,223 | 2/34 | Ophuls | 98—1.5 |
| 2,282,210 | 5/42 | Plum | 98—1.5 |
| 2,610,565 | 9/52 | Stuart | 98—1.5 |
| 2,872,858 | 2/59 | Cauldwell | 98—33 |
| 2,983,213 | 5/61 | Bohanon | 98—33 |

ROBERT A. O'LEARY, *Primary Examiner.*

MEYER PERLIN, *Examiner.*